US006540603B1

(12) United States Patent
Koskinen

(10) Patent No.: US 6,540,603 B1
(45) Date of Patent: Apr. 1, 2003

(54) METHOD AND SYSTEM FOR THE REGULATION OF VENTILATION IN A WELDING WORKSHOP

(76) Inventor: Juha Koskinen, Yrjönpolku 7, FIN-29600 Noormarkku (FI)

( * ) Notice: Subject to any disclaimer, the term of this patent is extended or adjusted under 35 U.S.C. 154(b) by 0 days.

(21) Appl. No.: 09/913,410

(22) PCT Filed: Feb. 11, 2000

(86) PCT No.: PCT/FI00/00101

§ 371 (c)(1),
(2), (4) Date: Aug. 14, 2001

(87) PCT Pub. No.: WO00/48752

PCT Pub. Date: Aug. 24, 2000

(30) Foreign Application Priority Data

Feb. 15, 1999 (FI) .................................................. 990302

(51) Int. Cl.[7] .............................................. B08B 15/02
(52) U.S. Cl. ............................. 454/58; 454/56; 454/66; 454/239
(58) Field of Search ............................. 454/49, 56, 58, 454/65, 66, 67

(56) References Cited

U.S. PATENT DOCUMENTS

| 3,747,301 A | * | 7/1973 | Glover et al. ............ 126/299 D |
| 3,926,104 A | * | 12/1975 | El Dorado ................... 266/144 |
| 3,945,308 A | * | 3/1976 | Jakimowicz et al. ........ 202/263 |
| 4,287,405 A | * | 9/1981 | Ohmae et al. ................ 15/319 |
| 5,170,673 A | * | 12/1992 | Ahmed et al. ................ 454/56 |
| 5,209,273 A | * | 5/1993 | Giuffredi et al. ............. 141/20 |

FOREIGN PATENT DOCUMENTS

| DE | 34 34 519 | 3/1986 |
| DE | 36 06 308 | 4/1987 |
| EP | 0 507 999 | 10/1992 |
| EP | 0 597 136 | 5/1994 |
| GB | 2 004 056 | 3/1979 |
| SE | 314 880 | 9/1969 |
| SE | 387 551 | 9/1976 |
| SE | 79068458 | 2/1981 |

OTHER PUBLICATIONS

"Methods for the solution of ventilation in a welding workshop", Library of the Institute of Occupational Health.

* cited by examiner

Primary Examiner—Derek Boles
(74) Attorney, Agent, or Firm—Young & Thompson

(57) ABSTRACT

A method and a system for the regulation of ventilation in a welding workshop, in which method the volume of supply air and/or extract air in the ventilation of the welding workshop is regulated. The basis of regulation of the volume is the load imposed on the electric power network by the welding equipment, e.g. the electric power consumed. The system comprises a set of measuring equipment for generating a measurement signal corresponding to the load imposed by the welding equipment on the electric power network. A set of control equipment has been arranged to regulate the volume of supply air brought into the welding workshop via a supply air duct and/or the volume of extract air removed from the welding workshop via an exhaust duct so as to achieve a level of ventilation proportional to the impurity load.

26 Claims, 6 Drawing Sheets

METHOD AND SYSTEM FOR THE REGULATION OF VENTILATION IN A WELDING WORKSHOP

Figure 1:
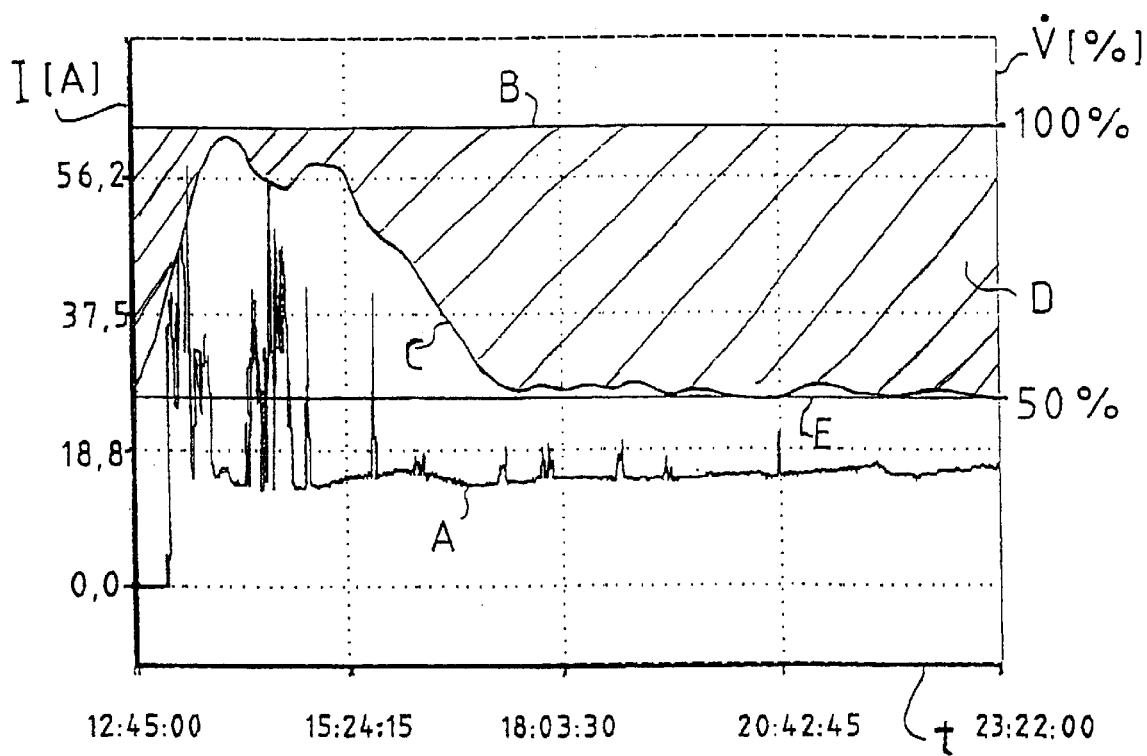

The present invention relates to a method as defined in the preamble of claim 1. Furthermore, the invention relates to a system as defined in the preamble of claim 12.

The regulation systems used in welding workshops are used to adjust the temperature and amount of air blasted into the workshop. The main purpose of ventilation in welding workshops is to remove the impurities produced in welding work from the workshop in a manner as energy-efficient as possible, yet without compromising on the quality of indoor air.

A commonly used method is a ventilation system based on constant air flow, in which the ventilation in a welding workshop is operated with a constant air flow. Ventilation regulation systems also often employ an expedient whereby the air flow is halved on the basis of outdoor temperature. The air flow, i.e. typically the fan speed, is reduced e.g. to half the design value when the outdoor temperature falls below a set limit, a typical limit being −15° C.

Another common practice is to provide the system with a timing feature, allowing the user to set the operating times of the ventilation system according to the working hours observed in the workshop. As for regulation, conventional ventilation systems also comprise temperature regulation equipment, and they may comprise regulation equipment for heat recovery.

The above-described conventional solution for the regulation of ventilation systems in welding workshops consumes energy in heating the air and in operating the motors of the supply and extract air fans.

The design of ventilation in a welding workshop is based on a theoretically pre-estimated impurity load produced in the workshop in a maximum load situation. In defining the ventilation, the designer has to use various coefficients to achieve a sufficient level of ventilation. The ventilation is designed by considering the factors affecting the quality of air in the working area, including: geometry of welding hall, welding methods, materials to be welded, number of welders, possible independent arrangements, method of supply air blasting, possible local extraction and its type. Another factor affecting the design is whether recirculation of air is employed or not. /Work Safety Fund (Työsuojelurahasto), Report, Workshop-specific ventilation instructions, workshop II, Methods for the solution of ventilation in a welding workshop ZT-05311-08; 1983-08-11, page 26/. Designed on these principles, the air flow is guaranteed to be right in respect of impurities in the worst case, but absolutely too large when the extent of welding activities is lower than in the design situation. In literature, the design rule used for air renewal in welding workshops is a coefficient of 2–6 times per hour.

In conventional systems, air is renewed uniformly regardless of the actual need for ventilation, i.e. the amount of impurities produced in welding work. This leads to a standard fan motor power and excessive energy consumption by the fans and the air heating system during periods when the impurity load is smaller than in the situation for which the air flow was designed.

As stated above, in prior-art ventilation systems for welding workshops, the constant level of general ventilation is always designed for the worst possible situation. For example, the impurity load produced when stainless steel is being welded is heavier than usual, and if stainless steel is welded in a welding workshop, the designer assumes that stainless steel may be welded at all welding stations in the workshop, which further increases the volume of general ventilation. In practice, however, it is not nearly in all situations that the maximum level of general ventilation is needed; instead, in many cases the required volume of general ventilation may be only half the maximum volume. Prior-art solutions have led to an excessive consumption of electric and thermal energy.

Especially in welding workshops where there is considerable variation in the amount of welding work, the above-described system wastes energy as the volume of ventilation is larger than necessary, and thus it increases the environmental stress via emissions in energy production. It can be stated that in many cases ventilation consumes the largest amount of heating energy, and sometimes the fans needed for ventilation are responsible for a significant proportion of the total electricity consumption. Therefore, there is a significant energy saving potential.

For the regulation of ventilation in welding workshops, there are also systems provided with equipment for the measurement of air contamination. Measuring systems based on air contamination can be used to control e.g. the efficiency of ventilation in a welding workshop. However, these systems have not been favored in the regulation of ventilation in welding workshops. This is due to their unreliable operation in demanding conditions, e.g. in welding workshops in metal industry. The reflection density measurements used to measure air contamination have the drawback that they do not detect all the gaseous impurities produced in welding.

When air contamination in a welding workshop is measured using a separate sensor, one of the problems encountered is how to decide which is the right place for the sensor in the welding workshop in respect of air contamination. Sensors measuring air contamination are also very expensive and have a poor performance, which is why they are very seldom used. Because of the large investment costs involved, these systems are economically usable in only very rare cases where the savings achieved via regulation of ventilation are large enough to guarantee a reasonable period of repayment of the investment.

As an example of prior-art technology, reference is made to specification DE 34 34 519 A, which concerns a method and system for extracting welding fumes from the welder's protective mask by means of a suction hose via a funnel placed on the front side of the protective mask. A suction fan or check valve placed in the suction hose is turned on and off on the basis of the start or end of the flow of welding current or wire feed. The suction intensity can be varied on the basis of the magnitude of the welding current. In this specification, the extraction suction from the welding mask is regulated and the welding current, i.e. the current supplied from the welding machine to the welding gun, is measured. Usually the welding current is direct current, which involves the problem that measuring direct current is difficult and the required measuring equipment is very expensive. Moreover, measurement based on wire feed is naturally not applicable to any other welding method. In the specification, the welding current (d.c.) of one machine is measured. The current may be hundreds of amperes for each welding machine, which is why building a measuring system is expensive and difficult especially in the case of a welding workshop containing several welding machines.

The object of the invention is to disclose a control engineering solution which makes it possible to eliminate the drawbacks of prior-art technology economically as profitably as possible.

The method and the system of the invention are characterized by what is presented in the claims below.

According to the method of the invention, the load imposed on the electrical power network by the electric welding equipment is determined and, based on this determination, the volume of supply air and/or extract air is adjusted so as to achieve a level of ventilation proportional to the impurity load.

Correspondingly, the system of the invention comprises measuring equipment for generating a measurement signal corresponding to the load imposed on the electric power network by the electric welding equipment, and a set of control equipment has been arranged to adjust the volume of supply air and/or extract air on the basis of the measurement signal so as to achieve a level of ventilation proportional to the impurity load.

In the solution of the invention, the load imposed on the electric power network by a welding machine, a welding machine center or multiple-operator welding systems as used in industry is measured. This load is a direct indication of the extent of welding work done in the workshop and of the impurity load it produces in the welding workshop. It has been established via measurements that the load may vary a great deal, which is why regulation of ventilation based on the load is a sensible solution. The regulation solution of the invention significantly reduces the amount of heating energy consumed via ventilation, the amount of energy consumed by the fans as well as the maintenance costs of the ventilation plant.

The invention allows great savings to be achieved in the thermal and electric energy consumed by the ventilation equipment. Regulation of the volume of air flow affects the consumption of both thermal and electric energy. It is possible to save as much as 30% of the thermal energy consumed annually, which means a saving of about 60–65% in the electric energy consumed by the fans, provided that the speed of rotation of the fans is controlled by a frequency converter. In other words, if the air flow is reduced from 100% to 70%, then the electric power requirement of the fans will fall to about 35%.

The regulation solution is advantageous in respect of the cost of construction and operation. The system can also be utilized in corresponding other applications in which the volume of ventilation is defined on the basis of the impurity load and in which the magnitude of the impurity load can be determined with a sufficient accuracy as mentioned above.

In an embodiment of the method, general ventilation in the welding workshop and/or welding station-specific local ventilation are/is regulated. The method and system are also excellently suited for application in welding workshops provided with local ventilation systems based on recirculation of air, in which the welding fumes are filtered but gaseous impurities are not, in which case the gaseous impurities have to be removed by general ventilation. According to the invention, both general ventilation and local ventilation can be regulated, jointly or separately. Sometimes both general and local ventilation systems are in use, and both can now be regulated in accordance with the need for ventilation.

In addition, the method and system of the invention are also applicable for use in welding workshops in which local ventilation is difficult to use and is replaced with general ventilation as far as possible. In many cases, the use of local extraction has also been restricted because in shielded arc welding local extraction undesirably tends to remove the shielding gases as well. Therefore, there is a trend toward replacing local ventilation with forced general ventilation, which is then designed to cover even that part of ventilation that would otherwise have been taken care of using local ventilation. By regulating this kind of forced general ventilation by the method of the invention, significant cost savings will be achieved.

In an embodiment of the method, the volume of supply air and/or extract air is regulated using discontinuous control methods known in themselves. A discontinuous control mode may be implemented be e.g. using two-level (on-off) control or so-called intermediate position control (two-level control with a rest position, three-point control).

In an embodiment of the method, the volume of supply air and/or extract air is regulated using continuous control methods known in themselves. The continuous control may be implemented using e.g. proportional control, proportional plus integral control or proportional plus integral plus derivative control. The volume of supply air and/or extract air may be regulated using e.g. follower control in which the reference variable is determined on the basis of measurement data collected from load information about the welding machines in the welding workshop. Other known control methods may also be applied in the regulation of the volume of supply and/or extract air. To achieve a sufficient smoothness of regulation, the reference variable for the control of the volume of supply and/or extract air (initial data for the regulator) is given with a delay as compared with the value of the reference variable obtained from the load measurement.

In an embodiment of the method, the temperature of supply air is regulated on the basis of the above-mentioned load determination. Reducing the supply air temperature results in more effective extraction of impurities from the welding workshop, socalled thermal deplacement being achieved especially via deplacement ventilation. As the supply air is cooler than the indoor air, it descends toward the floor surface of the welding workshop, thermally displacing the welding fumes in the working zone.

In an embodiment of the method, the volume of supply and/or extract air is regulated in conventional ways, which may be selected from the following:

damper control by means of a damper or a supply/extract air valve;

control of the rotational speed of the fan motor using two single-speed motors, a so-called Dalander circuit, a multi-speed motor, a gearing, an electric frequency converter and a cage induction motor, a direct-current motor with thyristor control;

control of fan speed using a hydraulic switch blade angle control, changing the pressure difference and air flow by varying the angular position of the fan blades;

leading blade control, with a leading blade controller mounted at the suction inlet of the fan, creating in the air flow a rotary motion in the direction of rotation of the blade wheel;

eddy current switch.

In an embodiment of the method, the load imposed by the welding equipment on the electric power network is determined by measuring the magnitude of the current, power, energy, reactive power and/or reactive energy consumed by the welding equipment.

In an embodiment of the method, the utilization time of the load imposed by the welding equipment on the electric power network is determined.

In an embodiment of the method, the level of the load imposed on the electric power network by welding devices (welding machine assemblies and/or individual welding machines) using different welding methods is measured; and the volume of supply and extract air is regulated by weighting its adjustment by predetermined weighting values corresponding to different welding methods being used. Since different welding methods produce different impurity loads, it will be advantageous to define for different welding methods different weighting values influencing the regulation of the volume of supply and/or extract air. The selection of weighting for each welding method may be made automatically or manually.

In an embodiment of the system, the control equipment comprises regulating devices for the regulation of the volume of supply and/or extract air and a computation and control unit for receiving a measurement signal from measuring equipment and for giving to the regulating devices a control signal proportional to the measurement signal.

In an embodiment of the system, the ventilation equipment comprises equipment for general ventilation in the welding workshop.

In an embodiment of the system, the ventilation equipment comprises welding station-specific local ventilation equipment.

In an embodiment of the system, the ventilation equipment comprises a supply air fan and a first motor for driving the supply air fan; and the control equipment comprises a first regulator for regulating the rotational speed of the first motor.

In an embodiment of the system, the ventilation equipment comprises an extract air fan, a second motor for driving the extract air fan; and the control equipment comprises a second regulator for regulating the rotational speed of the second motor.

In an embodiment of the system, the first regulator and/or the second regulator is a frequency converter.

In an embodiment of the system, the control equipment comprises mechanical and/or electrical regulating means for the regulation of the volume of supply air and/or extract air.

In an embodiment of the system, the measuring equipment has been arranged to measure the magnitude of the current, power, energy, reactive power and/or reactive energy consumed by the welding equipment.

In an embodiment of the system, the welding equipment comprises an electricity supply center, such as a main distribution center, a rising center, a control center and/or a group distribution center, to which electricity supply center are connected a number of welding machines receiving their welding current from said electricity supply center, and that the measuring equipment has been arranged to measure in the electricity supply center the load imposed on the electric power network by the welding equipment. The load imposed on the electric power network can be measured considerably more easily from an electricity supply center feeding several welding machines. In this way, the load imposed on the electric power network by a plurality of welding machines in the same workshop can be measured by means of a single or a few cheap measuring devices.

In an embodiment of the system, the measuring equipment comprises a current transformer which is connected to the power supply line feeding the welding equipment for generating a measurement signal to be taken to a regulator, said transformer being placed on the side of the electric power network. Measuring the load by means of a current transformer is an advantageous solution because there are commercially available current transformers which can be connected to logic circuits and supervisory relays and which provide a standard current or voltage output applicable to the inputs of these systems.

In an embodiment of the system, the power supply line is a three-phase current line, the current transformer being connected to one of the phases. A reliable measurement result is thus obtained in a very simple manner as the load imposed by the machines is symmetrical on the side of the electric power network, in other words, each phase of the three-phase supply line carries an equal current. Welding machines are usually of a three-phase design.

In an embodiment of the system, the measuring equipment has been arranged to measure the operating time of the welding equipment.

It is possible to integrate with the control equipment even other facilities for the regulation of general ventilation. These may include e.g. regulation of the volume of recirculated air, regulation of supply air temperature, regulation of heat recovery equipment, regulation of pressure in the air ducts, regulation of temperature in the workshops, etc. Using an integrated system, it is possible to optimize the regulation with respect to ventilation because, in addition to the volume of air flow, the system takes into account other aspects of regulation of ventilation as well.

Figure 2:
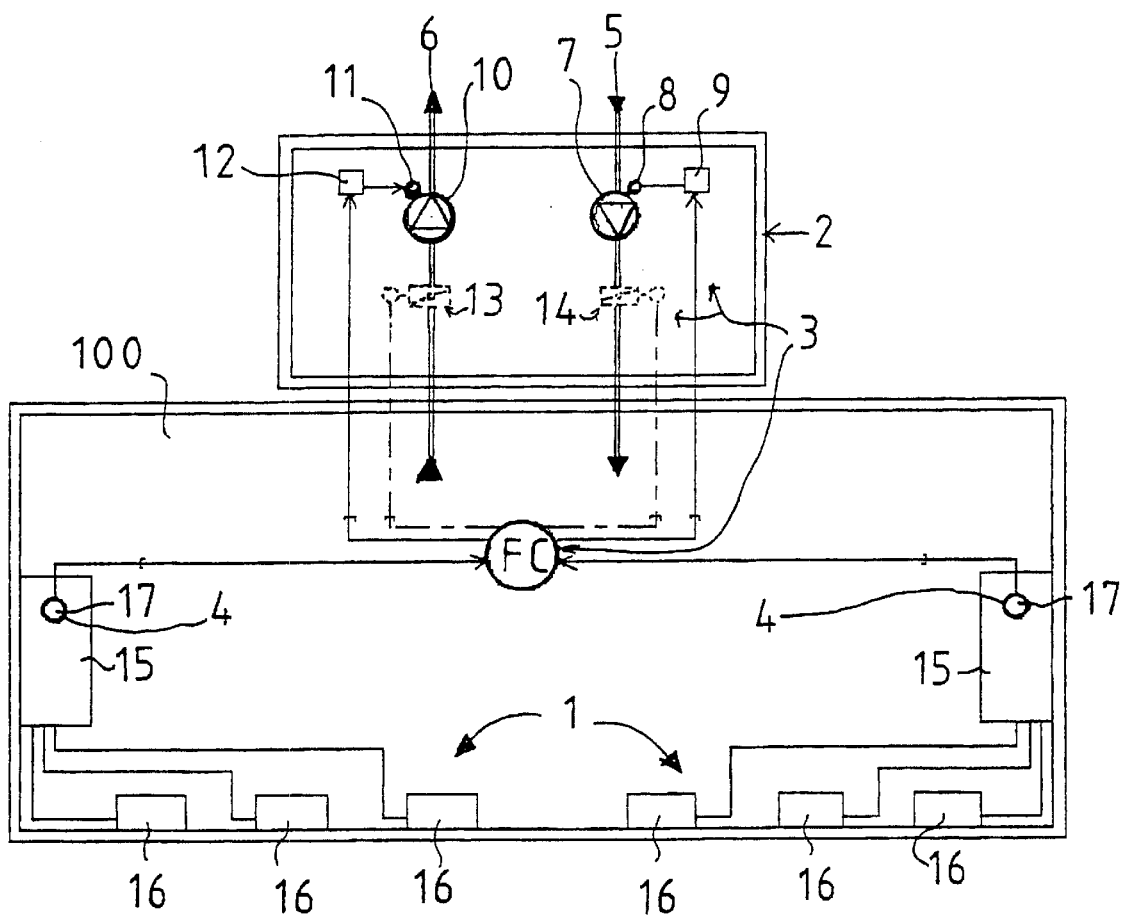
Figure 3:
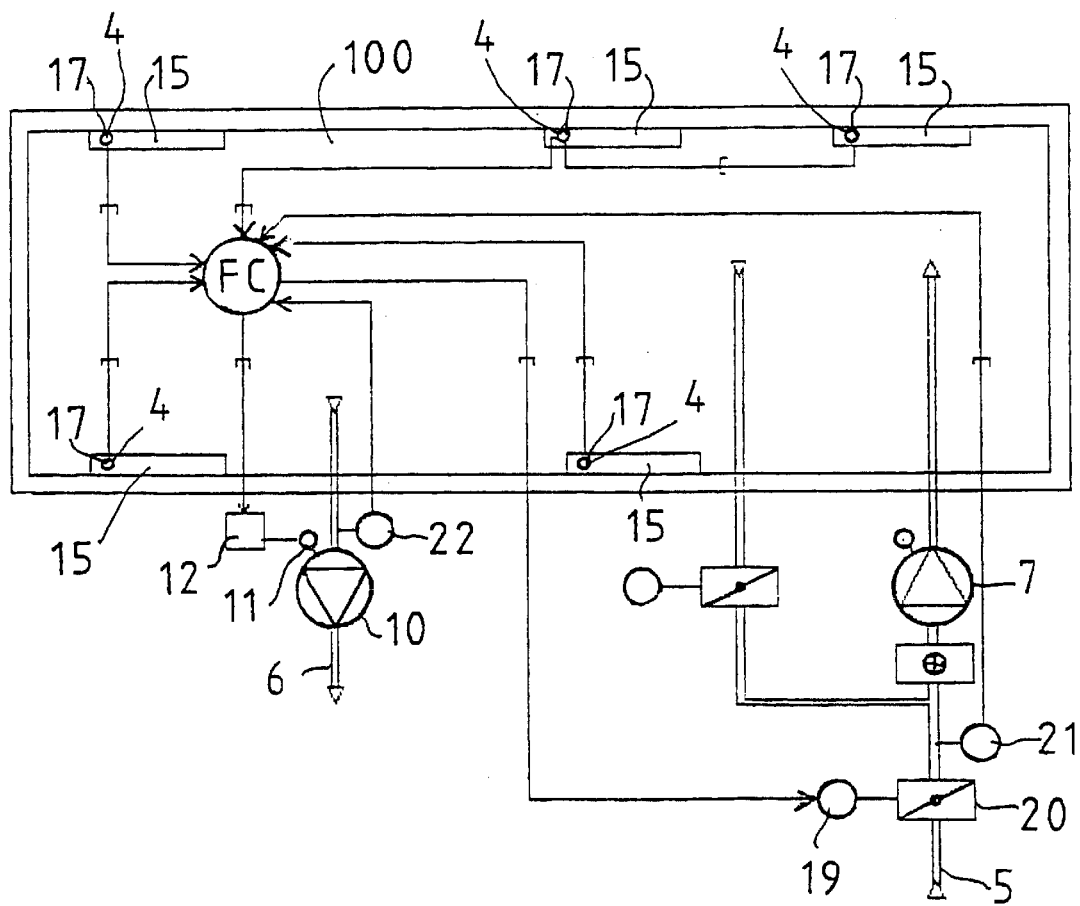
Figure 4:
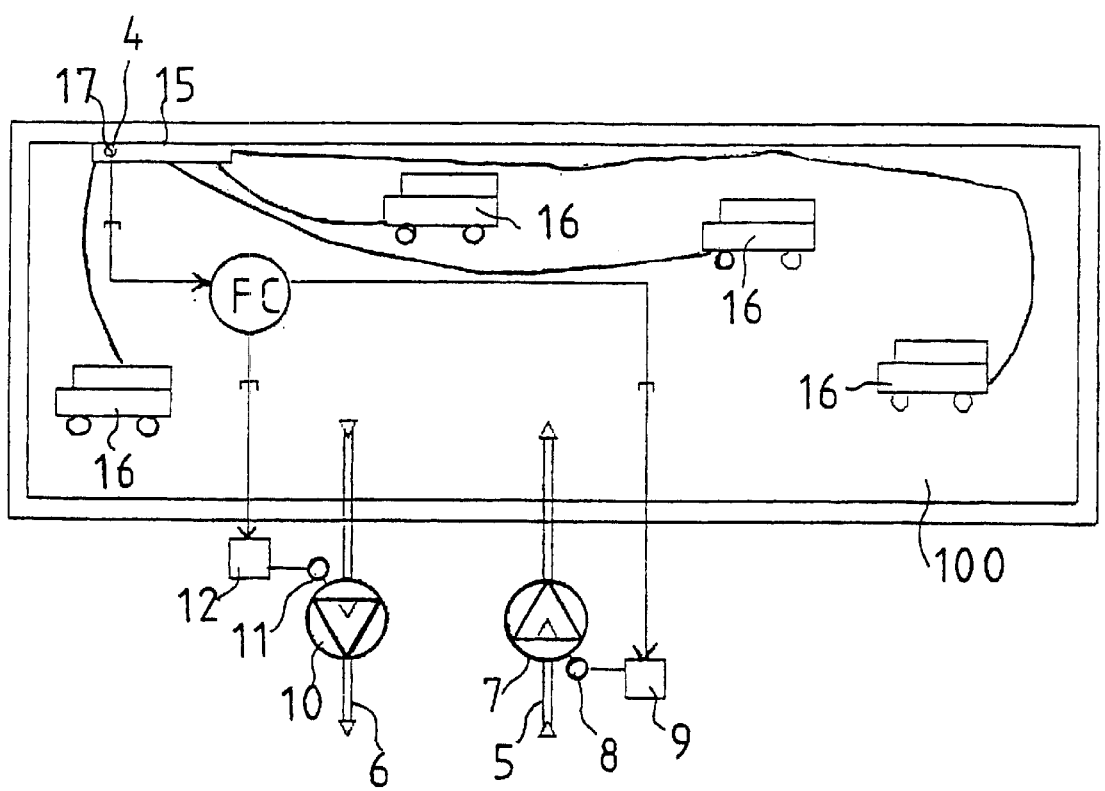
Figure 5:
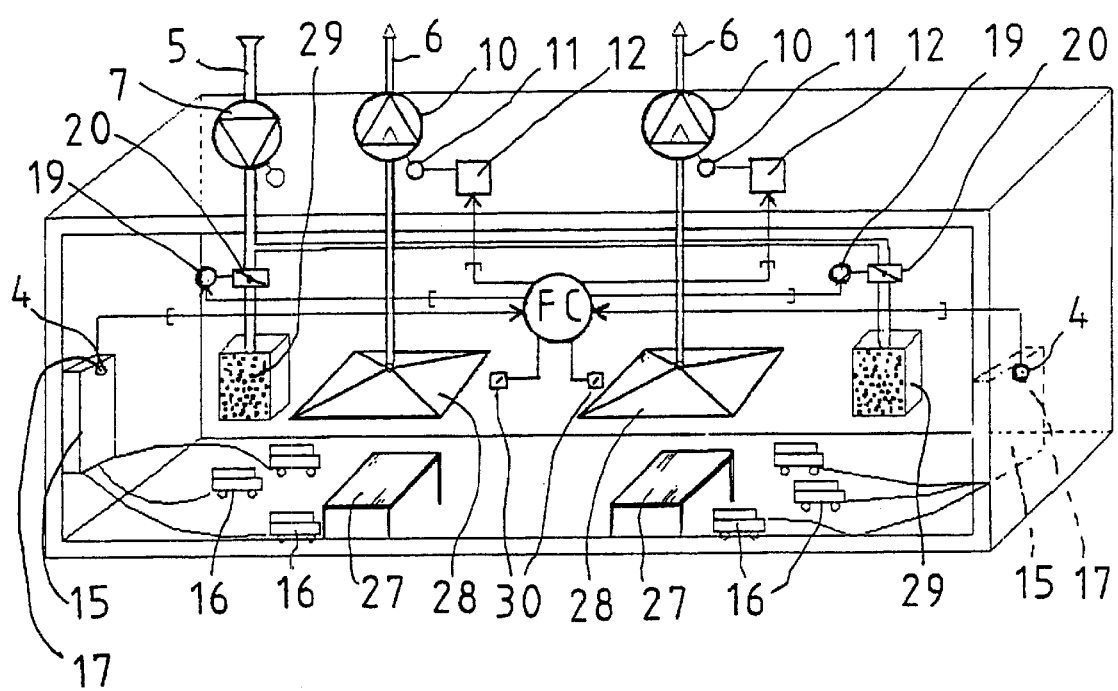
Figure 6:
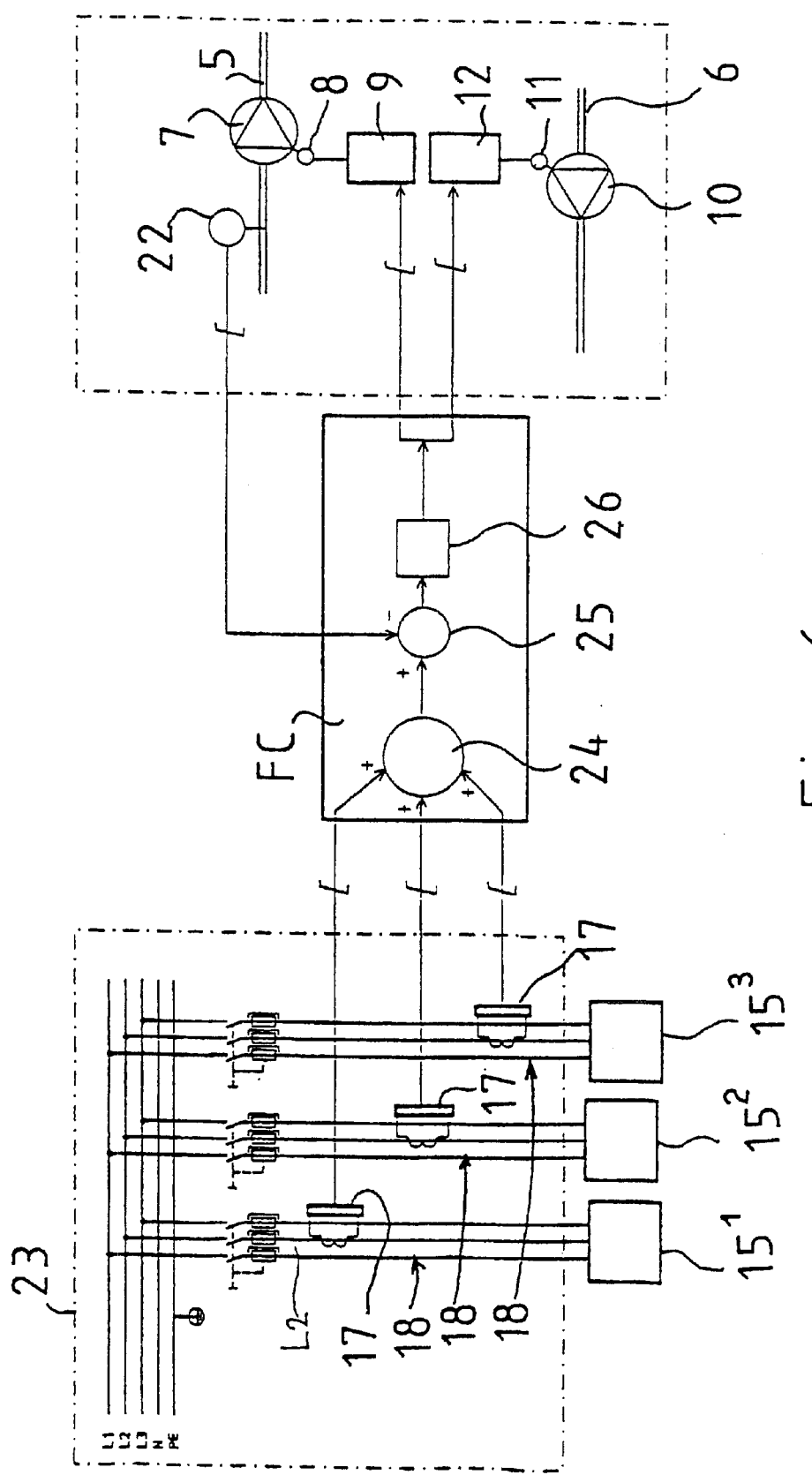

FIG. 1 presents a visualization of the possibilities of saving heating energy in ventilation, based on the current taken from the electric power network by an actual multiple-operator welding machine, FIG. 2 presents a diagram representing a first embodiment of the system of the invention, FIG. 3 presents a diagram representing a second embodiment of the system of the invention, FIG. 4 presents a diagram representing a third embodiment of the system of the invention, FIG. 5 presents a diagram representing a fourth embodiment of the system of the invention, and FIG. 6 presents a diagram representing a fifth embodiment of the system of the invention.

On the basis of FIG. 1, we can establish the truth of the claims regarding the energy savings achievable by applying the invention. The diagram in FIG. 1 represents a measurement performed on one day during a ten-hour period. The horizontal axis is the time axis. The left-hand vertical axis represents the current in amperes taken from the electric network by a multiple-operator welding machine. The right-hand vertical axis represents the volume of ventilation as a percentage.

It can be seen from FIG. 1 that curve A, which represents the current taken from the electric network by a multiple-operator welding machine, varies a great deal as a function of time, between about 15 amperes and about 60 amperes, as can be read from the left-hand vertical axis. Nevertheless, the volume of ventilation in the welding workshop, represented by line B, remains at a constant level all the time because the system is not provided with a regulation system based on the amount of a.c. current 1 taken from the electric network by the welding equipment.

If the system were equipped with air volume regulation according to the invention, then the volume of ventilation could be controlled as indicated by curve C, in which case the air flow would change depending on the load.

In this way, it would be possible to achieve a saving proportionally equal to the shaded area D in the energy consumed for heating of ventilation as compared with regulation based on constant air flow (line B). When the current in the multiple-operator welding machines falls permanently to an idling level, the volume of air flow can be reduced e.g. to a basic level of 50% (line E). It is also to be noted that a significant proportion of the electric energy consumed by the fans can be saved if a frequency converter is utilized in the regulation. Curve C in FIG. 1 is an imaginary one and in reality it may be different depending on the regulation speed and the parameters. Control parameters consistent with the need are defined experimentally.

FIG. 2 presents a system for the regulation of general ventilation in a welding workshop 100. Disposed in the welding workshop 100 is an aggregate of welding equipment 1 comprising a number of welding machines 16, to which the welding current is supplied from a group distribution center 15. The system comprises an assembly of ventilation equipment 2 and a set of control equipment 3 for the regulation of the volume of air flow produced by the ventilation equipment. The system further comprises a set of measuring equipment 4 for generating a measurement signal corresponding to the load imposed on the electric power network by the electric welding equipment 1. The control equipment 3 has been arranged to regulate the volume of supply air supplied into the welding workshop 100 and/or the volume of extract air removed from the welding workshop via an exhaust duct 6, the regulation being based on the measurement signal corresponding to the load, so as to achieve a level of ventilation that is proportional to the impurity load produced in the welding workshop by the welding equipment being used.

The ventilation equipment 2 comprises a supply air fan 7 mounted in a supply air duct 5. A first electric motor 8, which is a cage induction motor, drives the supply air fan 7. The control equipment 3 comprises a first regulator 9 for regulating the rotational speed of the first electric motor 8 on the basis of a control signal given by the control equipment. The first regulator 9 regulating the rotational speed of the cage induction motor 8 is a frequency converter.

Moreover, the ventilation equipment 2 comprises an extract air fan 10 mounted in the exhaust duct 6. The extract air fan 10 is driven by a second electric motor 11. The control equipment 3 comprises a second regulator 12 for regulating the rotational speed of the second motor 11 on the basis of a control signal given by the control equipment. The second regulator 12 regulating the rotational speed of the cage induction motor 11 is a frequency converter.

Instead of using the above-described speed control of the fan motors, the regulation of the volume of air flow can be alternatively accomplished using electromechanically controlled regulating means 13, 14, so-called dampers, which are mounted in the supply air duct 5 and/or in the exhaust duct 6 for the regulation of the volume of supply air and/or extract air, respectively. The dampers 13, 14 and their control from a computation and control unit FC are depicted with broken lines in FIG. 2.

In the example in FIG. 2, the welding equipment comprises two group distribution centers 15. Connected to each one of the group distribution centers 15 are a number of welding machines 16, the figure showing diagrammatically three welding machines for each group distribution center, the machines receiving their welding current from the respective group distribution center 15. When welding work is going on, the air flow is regulated according to need on the basis of the impurity load produced by the welding work, with the measuring equipment separately measuring the load imposed on the electric power network by each group distribution center 15, using a measuring device 4 that measures current, power or energy. The measuring device 4 may comprise a current transformer 17 which gives a measurement signal to the computation and control unit FC, which, based on the measurement signals, computes appropriate reference variables for the regulators 9, 12.

During periods when no welding is going on, a basic level of ventilation may be maintained or alternatively the entire ventilation system may be stopped. Other control actions relating to ventilation can be carried out in the same way as they have conventionally been performed so far, and in other respects the ventilation system may be a conventional ventilation system.

The regulation method and arrangement can also be utilized in local ventilation systems in welding workshops, and the load imposed on the electric power network by each welding station can be measured. The volume of local ventilation can be controlled by means of a damper depending on the load or, alternatively, if the local ventilation system is provided with a separate fan, the rotational speed of the fan can be regulated according to the load of the welding equipment in the same way as described in the above example.

FIG. 3 presents a ventilation system for a welding workshop 100 in which the supply air fan 7 is used as a recirculation fan and in which recirculated air is used for heating the premises.

The welding workshop contains an assembly of electric welding equipment 1 comprising a number of electric welding machines (not shown) supplied with electricity from group distribution centers 15. The system comprises an aggregate of ventilation equipment and a set of control equipment for controlling the volume of air flow produced by the ventilation equipment. The system further comprises a set of measuring equipment for generating a measurement signal corresponding to the load imposed by the electric welding equipment on the electric power network. The control equipment has been arranged on the basis of the measurement signal corresponding to the load to regulate the volume of extract air so as to achieve a level of ventilation proportional to the impurity load.

In the system in FIG. 3, the control equipment measures from the side of the electric network the current supplied to the group distribution centers 15, using a measuring device 4 that measures current, power or energy, and passes the measurement signals to the computation and control unit FC. The measuring device 4 may comprise a current transformer 17. The computation and control unit FC controls the volume of supply air by regulating the motor 19 controlling the position of the damper 20 in the supply air duct 5. The drive motor 11 of the exhaust fan 10 in the exhaust duct 6 is controlled by means of a frequency converter, as in the previous example.

According to the invention, the parameters used to control the ventilation are always dependent on the load imposed on the electric power network by the welding equipment, but the regulation may be influenced by other factors as well. The supply air duct 5 is provided with a device 21 measuring the volume of supply air, which provides a feedback signal to the computation and control unit FC. Correspondingly, the exhaust duct 6 is provided with a device 22 measuring the volume of extract air, which provides a feedback signal to the computation and control unit FC, where the supply and extract air volumes are compared with respect to the computed reference value. The volume of supply air is measured to obtain a feedback signal representing the volume of supply air. The volume of extract air is measured to obtain a reference value for the volume of supply air. The volume of supply air can be adjusted e.g. to a level corresponding to the volume of extract air, or if it is desirable to maintain some underpressure in the welding workshop, the volume of supply air is adjusted to a level somewhat lower than the volume of extract air.

The supply air may also be regulated on the basis of a pressure difference measurement in which the pressure difference between the welding workshop and outdoor air or an adjacent space is measured.

The regulation can also be implemented by measuring the actual value of the frequency at the frequency converter 12 controlling the extract air fan 10 and transferring it to the computation and control unit FC, which computes the supply air value corresponding to the volume of extract air, and this value is then transferred as a control signal to the devices 19, 20 regulating the supply air. The control characteristic for supply air now changes in accordance with the reference value for the frequency converter 12 controlling the extract air fan 10.

FIG. 4 further presents a simple embodiment representing a small welding workshop with one group distribution center 15 and a number of movable welding machines 16 connected to it. The load of the welding machines is measured by means of a single measuring device 4, e.g. a current transformer 17, which provides a measurement signal to the computation and control unit FC, which controls the volume of supply and extract air on the basis of the load as in the embodiment illustrated in FIG. 2.

FIG. 5 presents an axonometric view of a ventilation system in a welding workshop 100 provided with two exhaust ducts 6 with extract air fans 10 and working on the principle of deplacement ventilation. The welding work is performed on welding benches 27. The inverted funnels 28 for local extraction are disposed directly above the welding benches 27. Characteristically, deplacement ventilation keeps the working zone clean by causing contaminated air to rise into the upper part of the working space. Deplacement ventilation makes use of the thermal energy present in impurity emissions, which causes an upward convection current to be set up. By supplying a current of fresh air into the working zone, the air containing impurities is caused to rise into the upper part of the production space and further out along with the extract air. Deplacement ventilation generally works quite effectively if it has been correctly designed and the production space contains no significant disturbing air currents that might carry some impurities gathered in the upper part of the production space back into the working zone.

The blast of supply air is directed to areas where the need is greatest. The supply air is brought into the vicinity of the welding benches via air supply devices 29, which are air supply elements designed especially for deplacement ventilation, the figure showing two such devices. The volume of supply air is regulated on the basis of the load measurement as provided by the invention. The regulation of the volume of supply air is implemented using a damper 20, the volume of supply air being regulated by the computation and control unit FC by controlling the motor 19 used to adjust the position of the damper 20 in the supply air duct 5. The figure shows two dampers 20. The damper 20 is disposed in the supply air duct 5 before the air supply device 29 in the direction of air flow. Correspondingly, the volume of extract air removed from the area is regulated using the same measurement signal representing the load, by controlling the rotational speed of the electric motors 11 driving the extract air fans 10 by means of frequency converters 12. If the group distribution centers for the welding machines, the exhaust machines and the air supply devices can be made to serve the same areas/compartments, a level of ventilation matched to the need in each area is achieved with this system. It is also possible to provide the system with a selector switch 30 or potentiometer or the like, which is connected to the computation and control unit FC and by means of which 30 the user can manually adjust the slope of the characteristic of intensity of ventilation. Thus, the user can control the efficiency of ventilation himself, depending on the welding method.

FIG. 6 presents an embodiment of the ventilation system for a welding workshop 100 in greater detail. The quantities representing the load of the welding machines are measured from the main distribution center 23 of the welding workshop by means of current transformers 17. The current transformers 17 are connected to one L2 of the phases in the three-phase supply lines 18 going to the distribution centers $15^1$, $15^2$, $15^3$ for the welding machines. Group distribution center $15^1$ may feed e.g. machines doing metal arc welding with covered electrode. Group distribution center $15^2$ may feed e.g. multiple-operator welding machines. Group distribution center $15^3$ may feed e.g. MIG/MAG welding machines.

The current transformers 17 used may be a model (e.g. Carlo Cavazzi A82-20XX) that produces a 4–20 mA measurement signal directly proportional to the current supplied to the group distribution center, which is the type of measurement signal usually employed today. The current transformers 17 are cheap components and they are capable of accurate and reliable load measurement in real time. The measurement signals representing the load are transferred into the computation and control unit FC. The computation and control unit FC can be implemented e.g. using a PC-programmable multivariable regulator unit (e.g. Ascon AC-20), which can be freely programmed. The analog measurement signals obtained from the current transformers 17 are converted in the input circuit of the unit FC into a digital signal, which is passed to an adder 24 which processes the measurement signals using different weighting values so as to take into account the different impurity load effects of different welding methods in the regulation. The actual value of the volume of supply air is measured by a measuring device 22 placed in the supply air duct 5. The measuring device 22 produces a feedback signal to a differential element 25, from whose output a difference quantity is taken to a variable gain amplifier 26. In the adder 24, based on the measurements, a set value is calculated from each input and transferred to the variable gain amplifier 26. Using the parameters given, the variable gain amplifier 26 calculates the control variables, which are converted in the output circuit of unit FC from digital form into an analog control variable 4–20 mA, which is taken to the frequency converters 9 and 12 (e.g. Mitsubishi FRA-24E-18.5K-EC) controlling the rotational speed of the motors 8 and 11 of the supply air fan 7 and extract air fan 10, thus regulating the volume of supply air and extract air. In this way, need-oriented ventilation proportional to the impurity load being produced in the welding workshop is achieved, allowing savings to be made in the thermal and electric energy consumed by ventilation.

The invention is not restricted to the examples of its embodiments described above, but many variations are possible within the scope of the inventive idea defined in the claims.

What is claimed is:

1. Method for the regulation of ventilation in a welding workshop housing electric welding equipment, characterized in that the load imposed on the electric power network by the electric welding equipment is determined and, based on this determination, the volume of supply air and/or extract air is regulated so as to achieve a level of ventilation proportional to the impurity load.

2. Method as defined in claim 1, characterized in that the volume of supply air and/or extract air in general ventilation in the welding workshop is regulated.

3. Method as defined in claim 1, characterized in that the volume of supply air and/or extract air in welding station-specific local ventilation is regulated.

4. Method as defined in claim 1, characterized in that the mode of control used in regulating the volume of supply air and/or extract air is discontinuous control.

5. Method as defined in claim 1, characterized in that the mode of control used in regulating the volume of supply air and/or extract air is continuous control.

6. Method as defined in claim 1, characterized in that the temperature of the supply air is regulated on the basis of the above-mentioned load determination.

7. Method as defined in claim 1, characterized in that the volume of supply air and/or extract air is regulated by throttling the flow, controlling the rotational speed of a fan motor, adjusting the blade angle of the fan blades, adjusting the leading blades in the fan inlet, and/or by controlling it by means of an eddy current switch.

8. Method as defined in claim 1, characterized in that the load imposed by the welding equipment on the electric power network is determined by measuring the magnitude of the current, power, energy, reactive power and/or reactive energy consumed by the welding equipment.

9. Method as defined in claim 1, characterized in that the utilization time of the load imposed by the welding equipment on the electric power network is determined.

10. Method as defined in claim 1, characterized in that the load imposed on the electric power network by welding devices employing different welding methods is measured; the volume of supply air and/or extract air is regulated by weighting the adjustment of the volume of supply and extract air by predetermined weighting values corresponding to different welding methods being used.

11. Method as defined in claim 10, characterized in that the weighting is set manually by the operator, depending on the welding method being used.

12. System for the regulation of ventilation in a welding workshop housing electric welding equipment (1), said system comprising an assembly of ventilation equipment (2) and a set of control equipment (3) for controlling the volume of air produced by the ventilation equipment, characterized in that the system comprises a set of measuring equipment (4) for generating a measurement signal corresponding to the load imposed on the electric power network by the electric welding equipment (1), and that the control equipment (3) has been arranged to regulate on the basis of the measurement signal the volume of supply air brought into the welding workshop via a supply air duct (5) and/or the volume of extract air removed from the welding workshop via an exhaust duct (6) so as to achieve a level of ventilation proportional to the impurity load.

13. System as defined in claim 12, characterized in that the control equipment (3) comprises regulating devices (9, 12, 19, 20) for the regulation of the volume of supply and/or extract air, and a computation and control unit (FC) for receiving the measurement signal from the measuring equipment (4) and for giving to the regulating devices a control signal proportional to the measurement signal.

14. System as defined in claim 12, characterized in that the ventilation equipment (2) comprises equipment for general ventilation in the welding workshop.

15. System as defined in claim 12, characterized in that the ventilation equipment (2) comprises welding station-specific local ventilation equipment.

16. System as defined in claim 12, characterized in that the ventilation equipment comprises a supply air fan (7) and a first motor (8) for driving the supply air fan; and that the control equipment (3) comprises a first regulator (9) for regulating the rotational speed of the first motor by using a control signal generated on the basis of the above-mentioned measurement signal corresponding to the load.

17. System as defined in claim 12, characterized in that the ventilation equipment comprises an extract air fan (10), a second motor (11) for driving the extract air fan; and that the control equipment (3) comprises a second regulator (12) for regulating the rotational speed of the second motor by using a control signal generated on the basis of the above-mentioned measurement signal corresponding to the load.

18. System as defined in claim 16, characterized in that the first regulator (9) and/or the second regulator (12) is a frequency converter.

19. System as defined in claim 12, characterized in that the control equipment comprises mechanical regulating means (12,14,20) for the regulation of the volume of supply air and/or extract air.

20. System as defined in claim 12, characterized in that the measuring equipment (4) has been arranged to measure the magnitude of the current, power, energy, reactive power and/or reactive energy consumed by the welding equipment.

21. System as defined in claim 12, characterized in that the welding equipment comprises an electricity supply center (15), such as a main distribution center, a rising center, a control center and/or a group distribution center, to which electricity supply center are connected a number of welding machines (16) receiving their welding current from said supply center, and that the measuring equipment (4) has been arranged to measure in the electricity supply center the load imposed by the welding equipment on the electric power network.

22. System as defined in claim 12, characterized in that the control equipment comprises means for weighting the adjustment of the volume of supply air and/or extract air by predetermined weighting values corresponding to different welding methods being used.

23. System as defined in claim 12, characterized in that the control equipment comprises a selection device (30) by means of which a weighting value for the adjustment of the volume of air that is consistent with the welding method being used can be selected manually by the operator.

24. System as defined in claim 12, characterized in that the measuring equipment (4) comprises a current transformer (17), which is connected on the side of the electric power network to the power supply line (18) feeding the welding equipment, for generating the measurement signal to be taken to the control equipment.

25. System as defined in claim 24, characterized in that the power supply line (18) is a three-phase current line, the current transformer being connected to one of the phases.

26. System as defined in claim 12, characterized in that measuring equipment (4) has been arranged to measure the operating time of the welding equipment (1).

* * * * *